No. 740,313. PATENTED SEPT. 29, 1903.
C. B. ROBERTSON.
TROLLEY CATCHER.
APPLICATION FILED DEC. 13, 1902.
NO MODEL.

Inventor
Charles B. Robertson

Witnesses
C. H. Walker
Geo. C. Tew

By Milo B. Stevens & Co.
Attorneys

No. 740,313. Patented September 29, 1903.

UNITED STATES PATENT OFFICE.

CHARLES B. ROBERTSON, OF OTTUMWA, IOWA.

TROLLEY-CATCHER.

SPECIFICATION forming part of Letters Patent No. 740,313, dated September 29, 1903.

Application filed December 13, 1902. Serial No. 135,088. (No model.)

*To all whom it may concern:*

Be it known that I, CHARLES B. ROBERTSON, a citizen of the United States, residing at Ottumwa, in the county of Wapello and State of Iowa, have invented certain new and useful Improvements in Trolley-Catchers; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to trolley-catchers of that kind adapted when the trolley-wheel jumps its wire to automatically draw down the trolley-pole to prevent it coming in contact with cross-wires or other obstacles. It particularly relates to that class of such devices in which the trolley-rope is attached to a spring-wheel which normally takes up slack in the rope and also to another wheel controlled by a more powerful spring, having a trip or pawl release operated by sudden movement of the rope, as when the wheel jumps the wire, causing the greater power of the stronger spring to check the escape of the rope and by winding the same on the wheel pull the trolley-head down, as stated.

The object of the invention is to provide a construction permitting ordinary movement of the rope without throwing the larger and stronger spring-wheel into action.

A further object is to improve the hub and bearing construction of the wheels.

A further object is to provide an improved contact device for sounding an alarm when the trolley-wheel jumps the wire.

Figure 1:
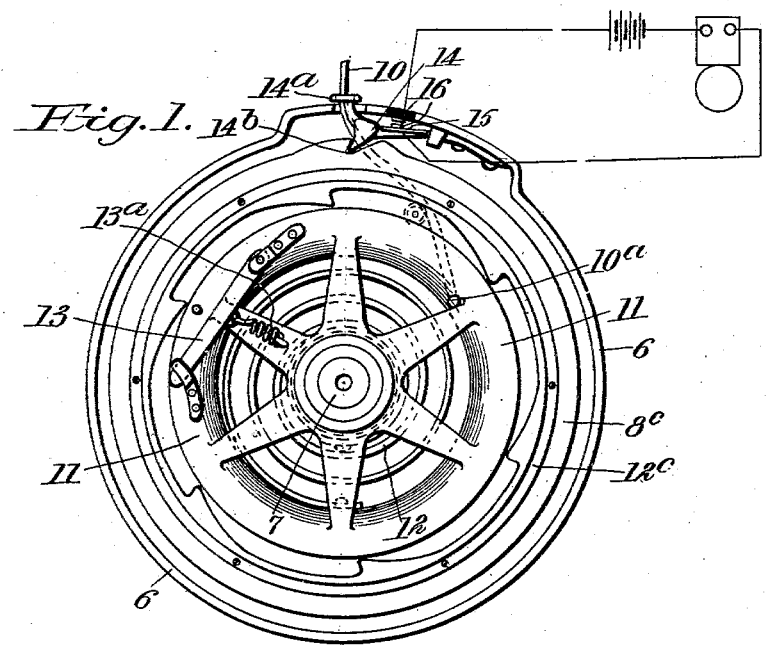
Figure 2:
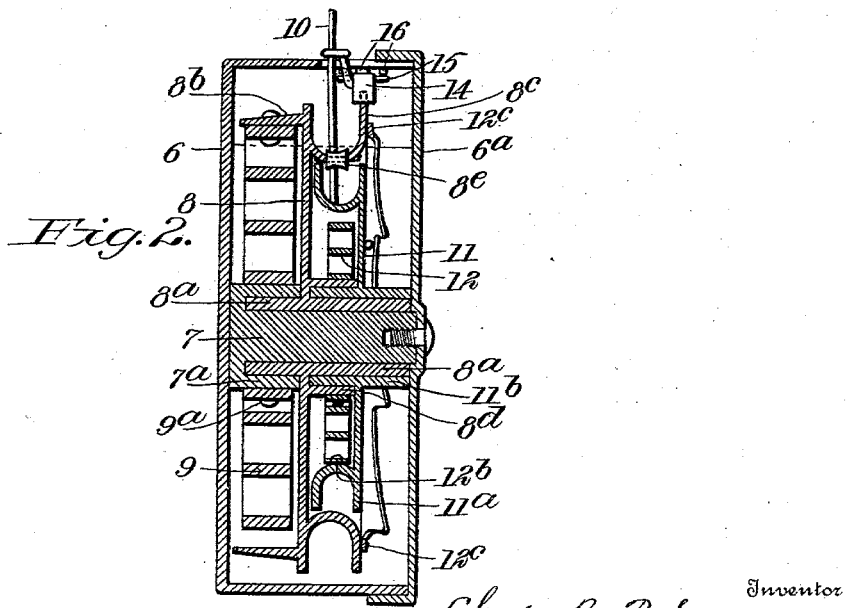

In the accompanying drawings, Figure 1 is an elevation of the device with the cover of the casing removed. Fig. 2 is a central cross-section.

Referring specifically to the drawings, the casing of the device is indicated at 6 and its cover at $6^a$. A spindle 7 is fixed to the casing and forms the axial bearing-support for the wheels. The spindle has an annular flange or sleeve $7^a$ at one end spaced from the body of the spindle to receive one end of the hub $8^a$ of the large wheel 8. The flange or sleeve thus overlies the hub and forms a place for the attachment, as at $9^a$, of the inner end of the large coiled spring 9, the outer end of which is attached to the rim $8^b$ of the wheel 8. This rim projects from one side of the web of the wheel. From the other side of the web a grooved or semicircular rim $8^c$ projects to receive the trolley-rope 10.

The small or inner wheel is indicated at 11, controlled by a spring 12, weaker than the spring 9, which is attached at one end to an annular flange or sleeve $8^d$, projecting from the web of the wheel 8, and at the other end to the grooved or semicircular rim $11^a$ of the small wheel, as at $12^b$. One end of the hub $11^b$ of the small wheel lies within the space between the hub $8^a$ of the large wheel and the sleeve $8^d$, as shown. The wheels rotate freely on the spindle and on each other.

The grooved rims of the wheels are in alinement, and the trolley-rope extends through a hole in the rim of the larger wheel and is attached to the rim of the small wheel, as at $10^a$. The hole in the large wheel through which the rope passes has a small pulley $8^e$ to prevent undue wear on the rope.

At $12^c$ is indicated a ring attached to the rim of the large wheel and provided with internal ratchet-teeth adapted to be engaged by a pawl 13, pivoted to the rim of the small wheel. This pawl acts by centrifugal force under rapid turn of the small wheel to engage the ratchet and lock the wheels together. It is normally held out of engagement by a spring $13^a$.

The escapement of the large wheel is controlled by a pawl 14, fixed to the casing and having an eye $14^a$, through which the trolley-rope passes. The pawl engages a notch $14^b$ in the rim of the large wheel. The action of the pawl controls the alarm attachment by means of a copper bar 15, attached to and insulated from the pawl. When the pawl flies up or out, this bar contacts with and bridges between two terminals 16, closing a circuit which actuates a bell or other alarm.

In the operation of this device the small wheel is free to move at all times and the tension of its spring holds the rope taut and also permits ordinary manipulation thereof, in which circumstances the pawl 13 is retained from engagement with the ratchet 12 by the spring 13ᵃ; but sudden and rapid upward movement of the rope rotates the small wheel with sufficient speed to cause the pawl to fly out and engage the ratchet. This produces a sudden stop, and the consequent jerk on the rope lifts the pawl 14 from its notch, which releases the large wheel, the strength of whose spring is sufficient to wind the rope and draw the trolley-pole down. At the same time the alarm is sounded to notify the conductor that the trolley-wheel is off, as above described.

What I claim as new, and desire to secure by Letters Patent, is—

1. In combination, a spindle having a spaced sleeve thereon; a normally stopped wheel the hub of which extends within the sleeve, said wheel having an annular flange spaced from the hub; a coiled spring connected at its inner end to the sleeve and at its outer end to the wheel; a pawl controlling the release of said wheel; a normally free wheel the hub of which extends within said flange; a spring attached at its inner end to the flange and at its outer end to the said free wheel; and a trolley-pole rope fastened to the free wheel and having sliding engagement with the other wheel and the pawl; substantially as described.

2. The combination with a trolley-pole rope, a normally stopped spring-actuated ratchet-wheel, and a pawl controlling the same, said wheel and pawl having sliding engagement with the rope, of a free wheel to which the rope is fastened, and a pawl carried by the free wheel and acting by centrifugal force to engage the ratchet and lock the wheels together, substantially as described.

3. The combination with a trolley-pole rope, and a spring-actuated normally stopped winding-wheel, and a free take-up wheel, for the same, of means actuated by the rotation of the take-up wheel to suddenly stop the run of the rope, and means actuated by the stopped rope to release the winding-wheel.

4. The combination with spring-actuated wheels having outer and inner alined rims, a trolley-pole rope extending through a hole in the outer rim and fastened to the inner rim, and a pawl actuated by the rope and engaging the wheel having the outer rim, to stop the same, of a centrifugally-operated device carried by the wheel having the inner rim, and means actuated by said device to stop the rope and thereby disengage said pawl.

5. The combination with a trolley-pole rope and winding-wheel for the same, of a free wheel to which this rope is fastened, a pawl having an eye through which the rope passes, normally engaging the winding-wheel and holding the same against rotation, and means actuated by the rotation of the free wheel to stop the same and the escaping rope, whereby the jerk of the rope will disengage the pawl and release the winding-wheel, substantially as described.

In testimony whereof I affix my signature in presence of two witnesses.

CHARLES B. ROBERTSON.

Witnesses:
   A. L. WHEELER,
   T. F. NORFOLK.